J. W. LEIGHTON.
METHOD OF MANUFACTURING BUSHINGS AND SIMILAR ARTICLES.
APPLICATION FILED FEB. 17, 1919. RENEWED NOV. 19, 1920.
1,416,846.  Patented May 23, 1922.
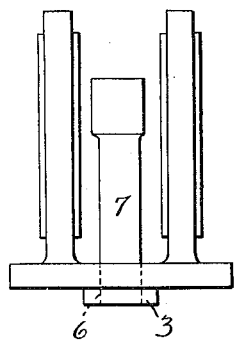
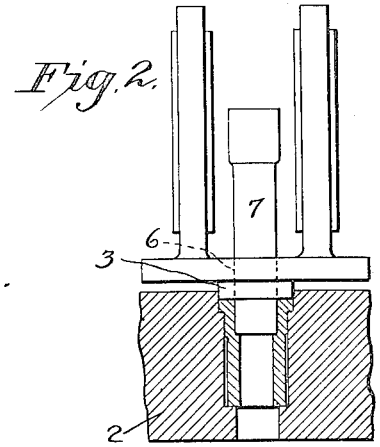
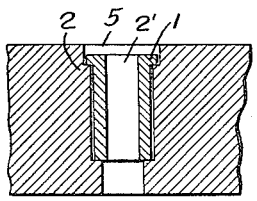
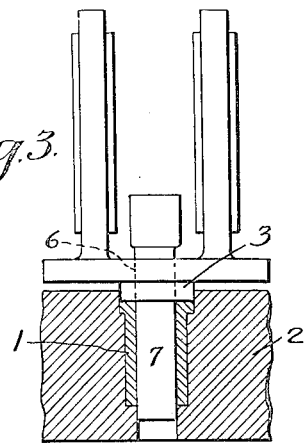
Inventor:
J. W. Leighton

UNITED STATES PATENT OFFICE.

JOHN WYCLIFFE LEIGHTON, OF TORONTO, ONTARIO, CANADA, ASSIGNOR TO PRESSED METALS COMPANY OF CANADA, LIMITED, OF TORONTO, ONTARIO, CANADA.

METHOD OF MANUFACTURING BUSHINGS AND SIMILAR ARTICLES.

1,416,846.               Specification of Letters Patent.      Patented May 23, 1922.

Application filed February 17, 1919, Serial No. 277,601. Renewed November 19, 1920. Serial No. 425,287.

*To all whom it may concern:*

Be it known that I, JOHN WYCLIFFE LEIGHTON, a subject of the King of Great Britain, and resident of the city of Toronto, county of York, Province of Ontario, in the Dominion of Canada, have invented certain new and useful Improvements in a Method of Manufacturing Bushings and Similar Articles, described in the following specification and illustrated in the accompanying drawings, that form part of the same.

The principal objects of this invention are, to produce bearings of superior quality in which the texture of the metal is altered from its original cast condition to form a bearing with extraordinary wearing qualities and capable of withstanding very heavy service.

A further object is to produce a bearing with a hardened wall which may be reamed or otherwise surface machined without destroying its hardened wear resisting quality.

A still further object is to effect a saving in material and labor thereby greatly reducing the cost of production.

The principal feature of the invention consists in confining a metal blank on all sides except the side to be operated upon and then moving a tool over the unconfined surface, subjecting the metal to a shearing stress applied progressively, the tool holding the metal under compression as it advances.

In the accompanying drawings:

Figure 1 is a diagrammatic part-sectional view of the forming tools used in treating a bushing showing the rough blank located in the die.

Figure 2 is a view showing the cooperating punch and die in an intermediate operating position; and Figure 3 is a view showing the position of the punch at the completion of the forming movement.

In metal bearings as usually manufactured, the rough blank is cast or otherwise formed with a surplus quantity of material and it is subjected to various machining operations to form it to the desired dimensions. These operations entail a considerable amount of handling which involves expense, and further, such operations leave the soft inner texture of the metal exposed and this does not present the most desirable bearing surface. Many attempts have been made to produce better bearing surfaces and it is well known in the art to use drifts, and burnishing broaches of many different forms to size the bearing and smooth down and burnish the bearing surface to a highly polished state. Such operations only produce a surface condition which soon wears and even such slight advantage obtained by these operations cannot be used where great quantity production is necessary and where the bearings are made at points distant from their places of use. When bearings in the form of bushings are eventually placed in position in the pieces of mechanism in which they are to be used they are usually pressed into place and as the sizes of the holes in which they are placed vary considerably the inner diameters of the bushings will vary and require reaming to size and a mere surface condition such as produced upon cold metal by a drift or a broach will be destroyed. To burnish the bushings when placed in their operative position is quite impossible in quantity production.

In practicing the present invention as here shown applied to a bushing, the cast blank 1 is formed with its exterior dimensions slightly less than the interior dimensions of the die 2 so that it will enter freely.

The blank is preferably heated and when it has been placed in the die the holding punch 3 is moved inwardly to close the blank receiving end 5 of the die thus confining all sides of the blank except the sides to be operated upon so as to prevent axial elongation.

The operating tool here shown as a punch 7 extends through the central opening 6 in the holding punch 3 and is of a diameter slightly larger than the hole 2' in the blank. A suitable double acting press is used and the holding punch remains stationary, closing the die during the operation of the center punch. As the punch 7 is slightly larger than the hole in the blank, the entering edge applies a shearing stress upon the metal and as the metal is in a semi-plastic condition its natural cohesion resists fracture and the shearing stress distributes laterally across the wall of the bushing. This causes a distortion of the crystalline formation of the metal extending from the treated surface inwardly into the body of the metal, the matrix being subjected to a dragging and compressing force which has the effect of breaking down and rearranging the crystals in such a manner as to present the most effective wearing surface. Practically the entire fibre of the metal is altered and the crystals are rearranged in curving planes caused by the dragging action so that the maximum of the amorphous material uniting the crystals will be presented to the bearing surface. The diameter of the punch is uniform, consequently the metal distorted and compressed by the action of the edge of the punch is held in confinement between the punch and the walls of the die. The result obtained is that the metal is extremely hard and compact. This condition is definitely shown by tests made with a Shore scleroscope. An original casting of good bronze registers on the scleroscope the hardness of 11 while a treated bushing registers as high as 30.

It is found in practice that bushings manufactured according to the method described and subjected to treatment only from the bore outward have a texture very hard at the inner surface and extending well into the wall. For example, a Shore scleroscope test of a bushing with a wall $\frac{3}{16}$ of an inch thick registered a hardness of 30 at the bore, 15 at the middle and 11 at the outer surface.

The forcing of the tool into contact with the bearing in the manner described applies a very considerable pressure and as the metal is confined against longitudinal elongation all inequalities of porosity in the metal created in the original casting of the metal are eliminated.

Any surplus material that may be in the blank is carried in front of the tool which is preferably formed with a square edge and any scale or foreign hard crystalline matter, such as sand, on the surface of the blank, is removed by the progressive movement of the tool.

Bearings of bronze and similar materials have been produced by this process in considerable quantities but it is found that ferrous materials may also be treated in a similar way without fracturing the metal and very excellent results have been obtained.

What I claim as my invention is:—

1. The method of producing a bearing surface which consists in confining a heated blank on all sides except the side to be operated upon, then moving a tool over the unconfined surface applying progressively a stress to distort the crystalline formation.

2. The method of manufacturing bearings, consisting in confining a blank and applying thereto in linear progression a compressing force to distort the crystalline formation of the metal under pressure and maintaining the treated portion of the metal under pressure until the operation is completed.

3. A method of making bearings, consisting in confining a heated blank against elongation within a die and subjecting it to the progressive action of a tool forced into contact with the blank to apply a stress effecting a flowing compression of the metal, said tool maintaining the metal under compression as it progresses.

4. A method of manufacturing bearings, consisting in confining a heated hollow cast blank against axial elongation within a die and forcing through the blank a punch of greater diameter than the interior opening of the blank thus applying a stress on the metal at the edge of the punch, such stress extending laterally outward through the wall of the bushing causing the metal to flow under the compressive force and to distort the crystalline formation.

5. A method of manufacturing bushings and the like, consisting in first casting a blank with a cylindrical opening therethrough of less diameter than the finished bearing surface, then heating the blank and placing it within a die, then closing the blank receiving end of the die to prevent elongation of the blank, then inserting a punch of greater diameter than the opening in the blank and forcing it through said blank.

6. A method of manufacturing bearings, consisting in confining a hollow blank and applying pressure to the working surface thereof progressively to effect the distortion of the crystalline structure of the metal through the wall to produce a hardness graduated from the said surface inwardly.

7. A method of manufacturing bearings consisting in confining a heated hollow blank against longitudinal elongation and applying an outward lateral compression thereto in linear progression to effect a radial compression of the metal against a rigid surface condensing the metal of the wall and distorting the crystalline structure to produce a graduated degree of hardness.

8. A bearing in which the crystalline formation of the part of the metal adjacent the working surface has been distorted and re-arranged to provide relatively amorphous material at the bearing surface.

9. A bearing in which the crystalline formation of the metal has been distorted and re-arranged with a concentration of finer crystals at the bearing surface and an increasingly coarser crystalline structure extending inwardly into the body of the metal.

10. A cast bearing of crystalline formation having its crystalline structure broken down and distorted at and adjacent the bearing surface, susbtantially as and for the purpose set forth.

JOHN WYCLIFFE LEIGHTON.